United States Patent
Knierim et al.

(10) Patent No.: US 12,399,748 B2
(45) Date of Patent: Aug. 26, 2025

(54) METHOD FOR OVERLOAD CONTROL IN A CONTAINER-VIRTUALIZED COMPUTING APPARATUS

(71) Applicant: Siemens Aktiengesellschaft, Munich (DE)

(72) Inventors: Christian Knierim, Munich (DE); Angela Schattleitner, Tuntenhausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 565 days.

(21) Appl. No.: 17/641,921

(22) PCT Filed: Aug. 31, 2020

(86) PCT No.: PCT/EP2020/074226
§ 371 (c)(1),
(2) Date: Mar. 10, 2022

(87) PCT Pub. No.: WO2021/052739
PCT Pub. Date: Mar. 25, 2021

(65) Prior Publication Data
US 2022/0334877 A1 Oct. 20, 2022

(30) Foreign Application Priority Data
Sep. 17, 2019 (EP) .................................. 19197775

(51) Int. Cl.
*G06F 9/50* (2006.01)
(52) U.S. Cl.
CPC ............ *G06F 9/505* (2013.01); *G06F 9/5077* (2013.01); *G06F 9/5083* (2013.01)

(58) Field of Classification Search
CPC ....... G06F 9/505; G06F 9/5077; G06F 9/5083
See application file for complete search history.

(56) References Cited

U.S. PATENT DOCUMENTS

| 8,935,399 B2 | 1/2015 | Rajan et al. |
| 2013/0173801 A1* | 7/2013 | Rajan .................... G06F 9/5055 709/225 |

(Continued)

FOREIGN PATENT DOCUMENTS

CN 109067867 A 12/2018

OTHER PUBLICATIONS

Abdelzaher T F et al.: "Web content adaptation to improve server overload behavior"; Computer Networks; Elsevier; Amsterdam, NL; vol. 31; No. 11-16; pp. 1563-1577; XP004304574; ISSN: 1389-1286; DOI: 101016.

(Continued)

*Primary Examiner* — Dong U Kim
(74) *Attorney, Agent, or Firm* — Schmeiser, Olsen & Watts LLP (57) ABSTRACT

Provided is a method for overload protection in a container-virtualized computing apparatus that provides a computer-implemented application by at least one work container, having the following steps: —receiving a request message to call the application, checking the currently existing workload of the computing apparatus against a stipulated load limit value, and if the current workload is higher than the load limit value, forwarding the request message to a load rejection container that provides at least one form of handling of the application that is modified compared to the work container.

13 Claims, 4 Drawing Sheets

(56) References Cited

U.S. PATENT DOCUMENTS

| | | | |
|---|---|---|---|
| 2014/0068611 A1* | 3/2014 | McGrath | G06F 9/5083 |
| | | | 718/1 |
| 2017/0214550 A1* | 7/2017 | Kumar | H04L 41/5045 |
| 2018/0054458 A1* | 2/2018 | Marck | H04L 63/1458 |
| 2018/0359218 A1* | 12/2018 | Church | H04L 43/062 |
| 2020/0314139 A1* | 10/2020 | Migault | H04L 45/64 |

OTHER PUBLICATIONS

Citrix Systems Inc: "NetScaler 12.0 Release Notes Documentation"; pp. 1-3919; XP55665441; https://docs.citrix.com/en-us/netscaler/downloads/citrixnetscaler-12-0.pdf; (part 1 and part 2).

PCT International Search Report mailed Feb. 11, 2020 corresponding to PCT International Application No. PCT/EP2020,074226 filed Aug. 31, 2020.

Citrix Systems Inc; "NetScaler 12.0"; Release Notes Documentation"; https://docs.citrix.com/en-us/netscaler/downloads/citrix-net scaler-12-0.pdf; Dec. 4, 2018.

\* cited by examiner

METHOD FOR OVERLOAD CONTROL IN A CONTAINER-VIRTUALIZED COMPUTING APPARATUS

CROSS-REFERENCE TO RELATED APPLICATIONS

This application claims priority to PCT Application No. PCT/EP2020/074226, having a filing date of Aug. 31, 2020, which claims priority to EP Application No. 19197775.0, having a filing date of Sep. 17, 2019, the entire contents both of which are hereby incorporated by reference.

FIELD OF TECHNOLOGY

The following relates to a method for overload control in a container-virtualized computing apparatus that provides a computer-implemented application by at least one work container, and to a corresponding computing apparatus and a corresponding computer program product.

BACKGROUND

Computer-implemented services, also referred to hereinafter as application, are often provided by a server system. A service user requests the service at the server system via a communication network, such as the Internet, for example. In this case, the application is often executed on the server system in an execution environment referred to as a virtual container. Container virtualization is a method for operating a plurality of instances of an operating system in isolation from one another on a so-called host system. In contrast to virtualization by a hypervisor, the containers share a common operating system and only specific parts of the operating system are duplicated and made available to each container separately. Container virtualization is therefore deemed to be particularly sparing in respect of resources. Containers ensure separate management of the resources allocated by the host system. A container that provides a specific application contains all the resources necessary for executing the application and can easily be transported and installed as a file. Resources are, for example, the program code, a runtime module, system tools, system libraries. Hereinafter a container provides a specific application. An application is thus encapsulated in a container.

An application is often provided by a container pool comprising a plurality of containers. The number of containers used for an application is generally highly scalable, such that in the case of a high-capacity utilization of the existing containers new containers that can provide a requested service or application are activated dynamically. A load balancer balances the application requests, for example http (hypertext transfer protocol) requests, among an ever-increasing number of containers. In this case, a maximum number of containers is usually defined in order firstly to cap the costs for providing the application and to prevent damage to the computing apparatus or the underlying system.

If the maximum number of containers has been reached and the number of request messages per unit time continues to rise or the number of open connections maximally processable in parallel is exceeded, request messages are generally not handled and for example an error message is returned to the user as a response to the request. An overload of the computing apparatus produced by a multiplicity of application requests, also referred to as a Denial-of-Service DoS attack, is often deliberately produced by a malicious third party or so-called bots. The application is then no longer accessible to authorized users.

Citrix Systems Inc: "NetScaler 12.0 Release Notes Documentation", Apr. 12, 2018 (2018-04-12), pages 1-3919, URL:https://doc.citrix.com/en-us/netscaler/downloads/citrix-netscaler-12-0.pdf describes a load balancer which, in the event of an overload of available application servers, ensures a reply to the application by a replacement web page from a different server being displayed, for example.

U.S. Pat. No. 8,935,399 B2 describes a method in which load balancing is performed with the aid of a cookie. In that case, the cookie is allocated, by an intermediary device, to a communication session that was rejected by one of a plurality of data processing machines. Every other data processing machine can subsequently identify the cookie and accept the communication session depending on the content of the cookie.

Abdelzaher T F et al: "Web content adaptation to improve server overload behavior", COMPUTER NETWORKS, ELSEVIER, AMSTERDAM, NL, vol. 31, no. 11-16, May 17, 1999 (1999-05-17), pages 1563-1577, XP004304574, ISSN: 1389-1286, DOI: 10.1016/S1389-1286(99)00031-6 describes a method in which, in the event of an overload of a web server, the content of one of the web pages is automatically adapted.

In the case of provision of an application by a container-virtualized system, in the case of overload situations the same measures are implemented as in the case of provision by a conventional system, the focus being on the scalability of the containers. In this case, scalability denotes the method in which, as the load increases, additional containers that provide the same application are generated and request messages with respect to the application are distributed to the further container(s) and processed there. Further measures in an overload situation are so-called overprovisioning, that is to say that more containers are kept ready than are needed for handling the customary number of request messages. These can handle the request messages in the case of exceptional load levels. A further measure is automated scaling up of resources with a very high upper limit, merging of container pools with further pools or rerouting to further pools, specifically to clusters in a cloud environment. Furthermore, measures are known which attempt to recognize an attack, in particular an attack by multiple requests and a rejection of requests that is provoked as a result, and not to handle or to reroute the request messages classified as defective. Furthermore, it is possible, without further indications, for a portion of the request messages to be discarded and not handled.

SUMMARY

An aspect relates to an improved measure in the case of overload situations in a container-virtualized computing apparatus in the case of which fewer authorized request messages for an application are rejected and the quality of service is thus improved.

In accordance with a first aspect, embodiments of the invention relate to a method for overload control in a container-virtualized computing apparatus that provides a computer-implemented application by at least one work container, comprising the following steps:
  receiving a request message for calling the application,
  checking the currently existing capacity utilization of the computing apparatus in relation to a predefined load limit value, and if the current capacity utilization is higher than the load limit value, forwarding the request message to a load defense container, which provides at least one, in particular, load-reducing processing form of the application that is modified in relation to the work container,
wherein the checking is carried out in a load balancing device realized by orchestration software or
the checking is carried out in a work container.

In the case of an overload situation of the computing apparatus that is predefined by the load limit value, a request message is not discarded, but rather forwarded to a specific load defense container, which enables resource-sparing processing of the request. Consequently, the provision of the application generates fewer resources than in the case of processing by a conventional work container and as a result, even in overload situations, more new request messages can be handled and the application can be provided at least in modified form. If the load limit has not been reached, the request is forwarded to the work container in an unchanged way.

In this case, a work container denotes a container in a container-virtualized computing apparatus that provides an unmodified, normal processing form, that is to say a processing form in normal operation. In contrast to the work container, a load defense container provides the application in modified form and comprises functions that reduce the number of request messages or the resources for providing the application. One such function checks, for example, whether the request was sent by an authorized user, and only forwards request messages from authorized users.

In an embodiment, the load balancing device forwards the request message to a work container or to a load defense container depending on the checking result.

Such a load balancing device can be for example a load balancer that is provided by software for orchestrating containers. A load balancing device works very efficiently and can thus check and forward a high number of request messages in a short time.

In an embodiment, forwarding is carried out in a work container.

This has the advantage that existing load balancing devices remain unchanged and only the sequence in the work containers has to be supplemented by the checking and forwarding function.

As a result, checking and balancing rules can be implemented in a simple manner and be carried out differently in different work containers.

In an embodiment, the checking and forwarding are carried out in a representative unit arranged in the work container.

The checking and forwarding are thus provided in the container separately from the actual application. Direct influencing of the application itself is avoided. The work container can thus be supplemented by the checking function and forwarding function in a simple manner.

In an embodiment, forwarding the request message to a load defense container is carried out in a state-oriented manner, in particular by a state-oriented packet inspection.

A request message is usually distributed to an arbitrary one of the existing work containers from a pool of work containers in a stateless manner. If an overload situation is recognized, that is to say that the predefined load limit value is exceeded, the request message and all further messages for the provision of the application are forwarded in a state-oriented manner, for example by an state-oriented packet check, to the one existing load defense container or to a load defense container pool containing a plurality of load defense containers. This is applied either by a load balancing device or by the forwarding function in a work container or in the representative unit within the work container. This ensures that the modified processing form of the application that is provided by the load defense container is carried out correctly and by the same load defense container in all steps.

In an embodiment, the load limit value has different load type-specific limit values that are dependent on the type of capacity utilization currently existing at the computing apparatus.

It is thus possible to react to different types of load by way of different measures. Different types of overload are, for example, reaching a maximum number of work containers, an abrupt overload as a result of a high number of request messages per unit time or too many applications open in parallel. Different types of overload can also arise as a result of the evaluation of error logs of the application that are administered in the container. A load type-specific limit value can also be predefined by a predefined maximum response time to a request message that has arrived. It is thus possible to react flexibly to the different types of the overload and of the disturbance of the computing apparatus that is associated with the corresponding overload.

In an embodiment, the request message is forwarded to different load defense containers, which provide different modified, load-reducing processing forms of the application, depending on the type of currently existing capacity utilization.

Load defense containers can thus be configured or tailored optimally to a load type. If there is a high number of request messages per unit time, indicating automatically generated request messages, for example, it is possible to carry out a check for example by prior incorporation of a challenge-response method, for example by sending a Captcha, which usually requires an input by a human user. If the query by the Captcha is not answered correctly, the request is deemed to be malicious and is not handled further. Alternatively, in the case of an overload as a result of a maximum number of connections per second being exceeded, it would be possible to use a load defense container with a load-reducing processing variant in which computing power can be saved for example by dispensing with dynamically generated web contents that burden the computing apparatus with a high load. A response message is sent, for example, which shows a waiting time with static contact, for example. In the event of too many parallel requests that are not closed, the overload container could employ shorter timeouts.

In an embodiment, the forwarding is additionally carried out depending on at least one of the following criteria, namely depending on a type of the requested application, an identifier of a sender of the request message, or a role of the user of the request message.

The forwarding in particular to a load defense container can thus be carried out dynamically and depending on the criteria. Different load containers with specific load defense functions can thus be created and used depending on the checked criterium. The only disadvantages about this is that further checks are needed for balancing the request messages and the forwarding process thus requires more time.

In an embodiment, in the load defense container the request message is checked in relation to a load balancing rule and at least one modified processing form of the application that is predefined by the load balancing rule is implemented depending on the checking result.

This has the advantage that different modified processing forms of the application are implemented in a single load defense container, and the processing forms are selected by checking the request message in relation to a load balancing rule. This has the further advantage that the general balancing of the request messages among the work containers, in particular, can be carried out without additional checking of the request message itself, and thus time-efficiently. Checking of the request message in a load defense container is carried out only in the case of an overload already having been recognized. These are merely a fraction of the request messages that are received in the computing apparatus.

In an embodiment, in the load defense container the request message is analyzed in relation to an attack pattern interrogated in particular at an attack database. In addition, by data exchange with IT security service providers, it is possible to update the attack patterns and react rapidly to globally occurring attacks (taking account of the Global Threat Landscape).

In a further embodiment, in the load defense container the request message, in addition being analyzed in relation to attack patterns, is analyzed in relation to heuristics determined in advance by a calibration of the system. The heuristics describe the customary behavior of the requester, e.g., that significantly fewer requests are made outside business hours.

Consequently, in the load defense container attack signatures that are generally determined and provided via access databases and updated continuously, for example, can be used for the analysis of the request message and for recognizing attack patterns. If a corresponding attack pattern is recognized, the request message can be identified as harmful and defense measures can be taken; by way of example, it is possible for the request not to be handled and/or to be reported to a superordinate unit.

All the described indicators for DoS attacks can be used by the container for calculating a DoS risk score for a request. The DoS risk score can be made available via an interface to further services and applications that handle or transmit the request.

In an embodiment, one or more load defense containers are provided depending on the capacity utilization of the computing apparatus, in particular in addition to the existing work containers or as a replacement for an existing work container.

By load defense containers that can be switched in dynamically, depending on the capacity utilization of the computing apparatus, it is possible to process a larger number of request messages without simple rejection or non-handling of request messages and to provide the user with at least reduced processing forms of the application. The requested application can be provided to the user more frequently. The quality of service for the user is thus improved.

A second aspect of embodiments of the invention relate to a computing apparatus for the container-virtualized provision of a computer-implemented application by at least one work container, comprising a receiving unit designed to receive a request message for calling the application, a checking unit designed to check the currently existing capacity utilization of the computing apparatus in relation to a predefined load limit value, and a forwarding unit designed to forward the request message to a load defense container, which provides at least one modified, in particular load-reducing, processing form of the application in relation to the work container, if the current capacity utilization is higher than the load limit value, wherein the checking is carried out in a mode balancing device (23) realized by orchestration software, or the checking is carried out in the work container (24).

The computing apparatus according to embodiments of the invention, with the same resources, provides the application with improved quality of service compared with a conventional computing apparatus, since more request messages are handled and fewer request messages from authorized users are discarded.

In an embodiment, the control unit is embodied in a load balancing device, and the load balancing device forwards the request message to a work container or to a load defense container depending on the checking result.

In an embodiment, the control unit is embodied in the work container, in particular in the form of a representative unit.

In this case, the control device can be embodied in each of the active work containers. Consequently, the load balancing device can be maintained unchanged and thus in a time-optimized way. The control device in the work container can be flexibly adapted for the application.

A third aspect of embodiments of the invention relate to a computer program product (non-transitory computer readable storage medium having instructions, which when executed by a processor, perform actions), comprising a computer-readable medium that is loadable directly into a memory of a digital computer, comprising program code parts suitable for carrying out the steps of the method as claimed in any of claims 1 to 11.

Unless indicated otherwise in the following description, the terms "receiving", "checking", "forwarding" and the like preferably refer to actions and/or processes and/or processing steps (also: communication protocols) which alter and/or generate data and/or convert the data into other data, wherein the data can be represented or can be present in particular as physical variables, for example as electrical pulses. The expression computing apparatus denotes electronic apparatuses having data processing properties and can be for example one or more servers which are used in particular in shared fashion by a plurality of cloud users and are referred to as a cloud system, which can process data in a computer-aided manner and comprise at least one processor for data processing.

In association with embodiments of the invention, "computer-implemented application" can be understood to mean for example an implementation of the application in which, in particular, a processor carries out at least one method step of the application. The respective "unit" or "device", for example the receiving or control unit or the load balancing device, can be implemented in terms of hardware technology and/or else in terms of software technology. In the case of an implementation in terms of hardware technology, the respective unit can be embodied as an apparatus or as part of an apparatus, for example as a microprocessor. In the case of an implementation in terms of software technology, the respective unit can be embodied as a computer program product, as a function, as a routine, as part of a program code or as an executable object.

A computer program product, such as a computer program means, for example, can be provided or supplied for example as a storage medium or else in the form of a downloadable file from a server in a network.

BRIEF DESCRIPTION

Some of the embodiments will be described in detail, with reference to the following figures, wherein like designations denote like members, wherein.

DETAILED DESCRIPTION

A computer-implemented application is provided by a computing apparatus comprising a single or a plurality of computing units, such as, for example, processors or else server units. The computing apparatus is operated in a container-virtualized mode of operation. In this case, an application is encapsulated and implemented as a self-contained system by containers in which, besides a program for processing the application, also operating system resources, runtime management, modules or else software libraries which are necessary for providing the application.

Figure 1:
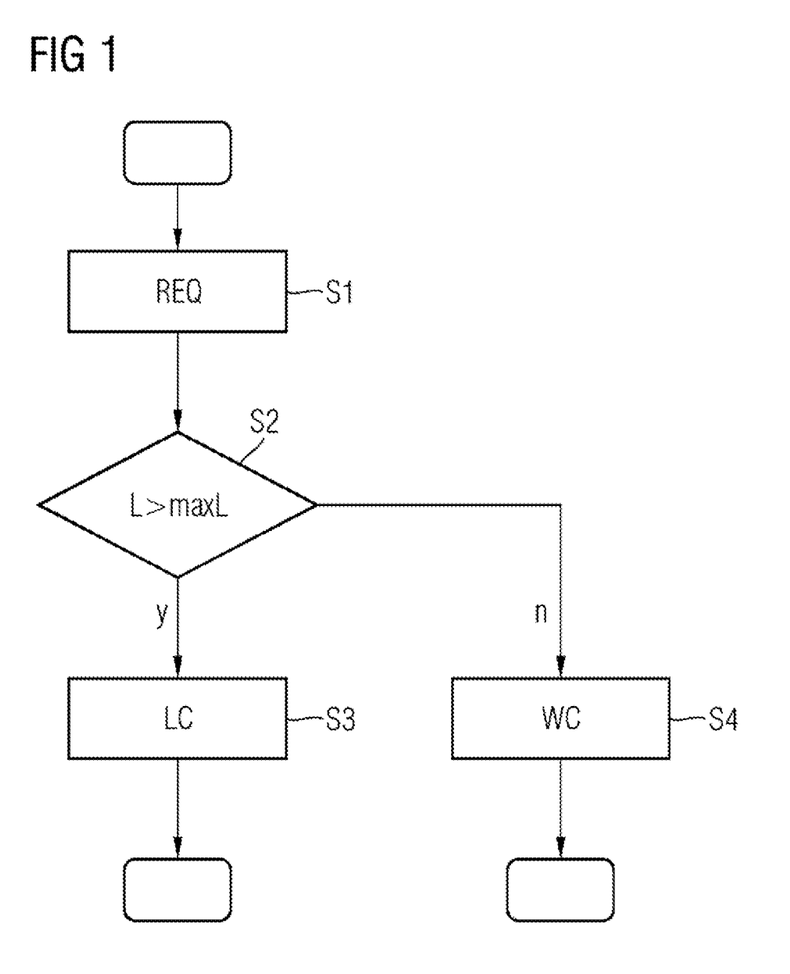
FIG. 1 shows a first embodiment of the method as a flow diagram.

A work container usually implements a multiplicity of instances of an application in a "normal" processing form. If new request messages can no longer be processed by a work container, then usually a new work container is activated and provided for handling these further request messages. Such additional load-based activation of containers is also referred to as autoscaling. If a maximum number of work containers is reached, further request messages are usually rejected and answered with an error message to the sender, for example. In order to reduce such rejection of permissible request messages, a method as illustrated in FIG. 1 is proposed.

Step S1 involves receiving a request message REQ for calling or starting a computer-implemented application in the computing apparatus. Afterward, method step S2 involves checking the currently existing capacity utilization L of the computing apparatus in relation to a predefined load limit value maxL. If it is ascertained during this checking that the current capacity utilization L is higher than the load limit value maxL, then the request message REQ is forwarded to a load defense container LC, which provides at least one modified, load-reducing processing form of the application in relation to the work container WC, see S3. If the capacity utilization L is less than or equal to the load limit value maxL, then the request message REQ is forwarded to a work container WC, see step S4, and provided by a conventional processing form of the application.

The load defense container LC responds to the request message by implementing for example additional measures for combating multiple request attacks, also referred to as (D)DoS attack, at the application level. Such measures are functions for recognizing possible request messages or rejecting request messages recognized as impermissible request messages. Such measures are implemented for example before the actual application is implemented, and together with the application itself constitute a modified, load-reducing processing form of the application. One such measure is for example prior incorporation of a challenge-response method prior to the actual implementation of the application. In this case, the computing apparatus sends the requesting device or user a challenge, to which the device or the user responds, and this is checked by the computing apparatus. This can be a cryptographic challenge-response method, for example, in which the challenge is altered by a cryptographic method in the device and returned to the computing apparatus and compared with the expected result in the computing apparatus. The challenge-response method can also be application-oriented, such that the application alters the challenge in a predefined way and returns it to the application in the computing apparatus. This can be for example the solving of a mathematical problem with the challenge as input parameter. The challenge-response method can be transparent to the user of the application or can alternatively demand a user input. This is the case for example with a captcha, in which for example the number of a specific object in an image sent to the user is answered by the user.

Furthermore, in a modified load-reducing processing form of the application, for example, instead of a dynamically generated page content that constitutes a particularly high load for the computing apparatus, it is possible to communicate just a static, predefined page content. In a further variant, a request message is answered with specific information only if this information is already available in the memory of the computing apparatus, for example as a result of a previous request. As a further modified load-reducing processing form, it is possible for example to send back a page content with lower resolution for representation in response to the request message.

A further modified load-reducing processing form of the application, provided by the work container, is achieved for example by an at least partial evaluation of the request message. In this case, for example, an IP address of the sender, a roll of the user or a priority identifier is determined and only request messages from authorized senders or rolls or for prioritized services are handled further, which are predefined for example by a positive list. All other request messages are not handled or are rejected. A roll of the user can be predefined for example by differently prioritized user classes, for example "preferred user", "premium user". A roll of the user can however also be "administrator", "service provider" or the like. Preferred handling of request messages can also take place depending on geographical regions, such that request messages from spatially localizable attackers are deliberately discarded or not handled.

In a further variant, in a load defense container the request message is analyzed in relation to an attack pattern and manipulated request messages are thus recognized prior to further handling. In the case of a message recognized as manipulated, it is possible, for example, for a warning signal to be generated and/or for the request message not to be handled further. In a further variant, in a load defense container the request message is analyzed in relation to heuristics, i.e., unusual behavior patterns in the case of requests. Manipulated request messages are thus recognized and classified as manipulated with high probability prior to further handling. In the case of a message classified as manipulated, it is possible, for example, for a warning signal to be generated and/or for the request message not to be handled further.

The load limit value maxL can have different load type-specific limit values depending on the type of capacity utilization currently existing at the computing apparatus. A load type-specific limit value is for example a value for the maximum number of work containers which are configured for the service, a value for a number of request messages per second, a value for a number of request connections open in parallel or applications running in parallel, or else a value for a maximum number of error logs. Error logs are determined by the evaluation of errors of the application that are administered in a work container, and are stored as error logs in the work container.

A measure adapted to the situation can be implemented depending on a corresponding type of overload. If the number of request messages per second is too high, for example, a challenge-response method is suitable for reducing this number. As a result, for example, mechanical transmission of request messages by so-called bots can be recognized and prevented. By contrast, if the number of request messages open in parallel exceeds the load type-specific limit value for the application, the utilization of an asymmetric resource consumption on the part of the computing apparatus by restrictions to the backend requests, i.e., by static contents instead of dynamic and resource-intensive contents being created and sent to the sender, could be a solution. Such an evaluation can also be administered by an artificial intelligence security algorithm.

In one variant, a load container LC provides all the described modified, load-reducing implementation forms of the application. However, it is also possible to provide load defense containers which comprise a single or a subset of the possible modified, load-reducing processing forms of the application. Accordingly, it is possible to use a request message depending on the type of currently existing capacity utilization to a respectively specific load defense container that provides a processing form optimized for the load type.

Furthermore, the forwarding can additionally be carried out depending on at least one further criterion. For this purpose, the request message is at least partly analyzed during the checking of the capacity utilization or during forwarding. In particular, indications in the header of the request message that contain information concerning the sender and concerning the requested application are evaluated and forwarding to different load defense containers is carried out depending for example on the requested application or depending on the identifier of the sender of the request message, for example the IP address of the sender, or depending on the role of a user of the request message. The request message can also be forwarded depending on a session identifier, also referred to as session cookie, which is likewise contained in the header of the request message.

One or more load defense containers LC can be provided depending on the capacity utilization of the computing apparatus or of the one or more active work containers WC present. In this case, a load defense container can either be provided in addition to the already existing work containers or else be started up as a replacement for an existing work container.

Figure 2:
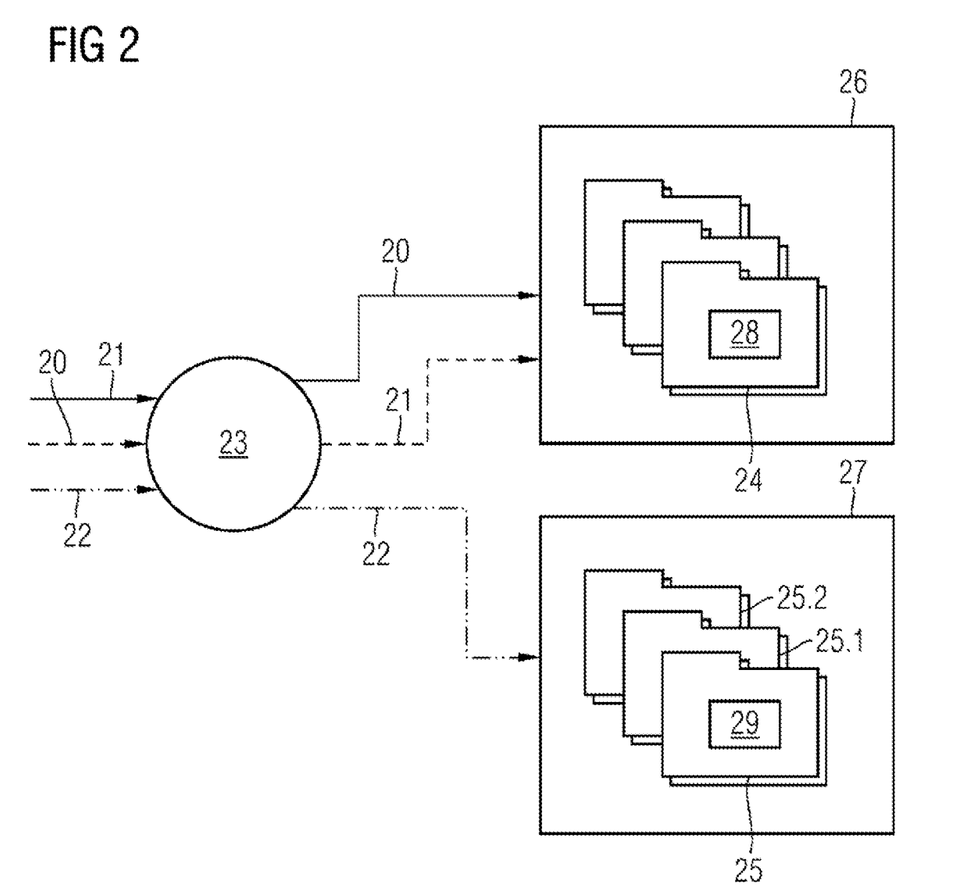
FIG. 2 shows a second exemplary embodiment of the method with checking in a load balancing device in a schematic illustration.

FIG. 2 shows an embodiment of the method in which request messages 20, 21, 22 are checked by a load balancing device 23 and are forwarded to a work container 24 or to a load defense container 25 depending on the checking result. In this case, a work container 24 provides the application in an unmodified processing form 28. Depending on the number of request messages or the load for the application, a plurality of work containers 24 in a work container pool 26 are provided. Load defense containers 25 provide the application by the modified load-reduced processing form 29. In this case, one or a plurality of load defense containers 25, 25.1, 25.2 in a load defense container pool 27 can likewise be provided. In this case, the load defense containers 25, 25.1, 25.2 can be present in different manifestations. The load defense containers 25.1 and 25.2 illustrated provide for example different modified processing forms for the application. The load defense container 25 can comprise for example a multiplicity of different modified processing forms. The load defense containers 25, 25.1, 25.2 can correspondingly comprise different load balancing rules.

The balancing of the request messages is implemented by the mode balancing device 23, which is typically implemented by so-called orchestration software, such as Kubernetes, for example.

In the embodiment illustrated, the capacity utilization of the computing apparatus with regard to the application is known to the load balancing device 23. The load balancing device 23 carries out the checking of the capacity utilization and also the forwarding depending on the result of the checking. The orchestration software has to recognize the overload situation and reroute the request message to a container with built-in node defense functions, i.e., the modified, load-reducing processing forms 29 of the application. The load defense containers 25, 25.1, 25.2 are likewise orchestrated in order to be able to scale them according to the load. If a load defense container 25 is started, a work container 24 is ended, for example, in order to prevent shortage of resources. Alternatively, specific resources can be kept available for the load defense containers 25.

Figure 3:
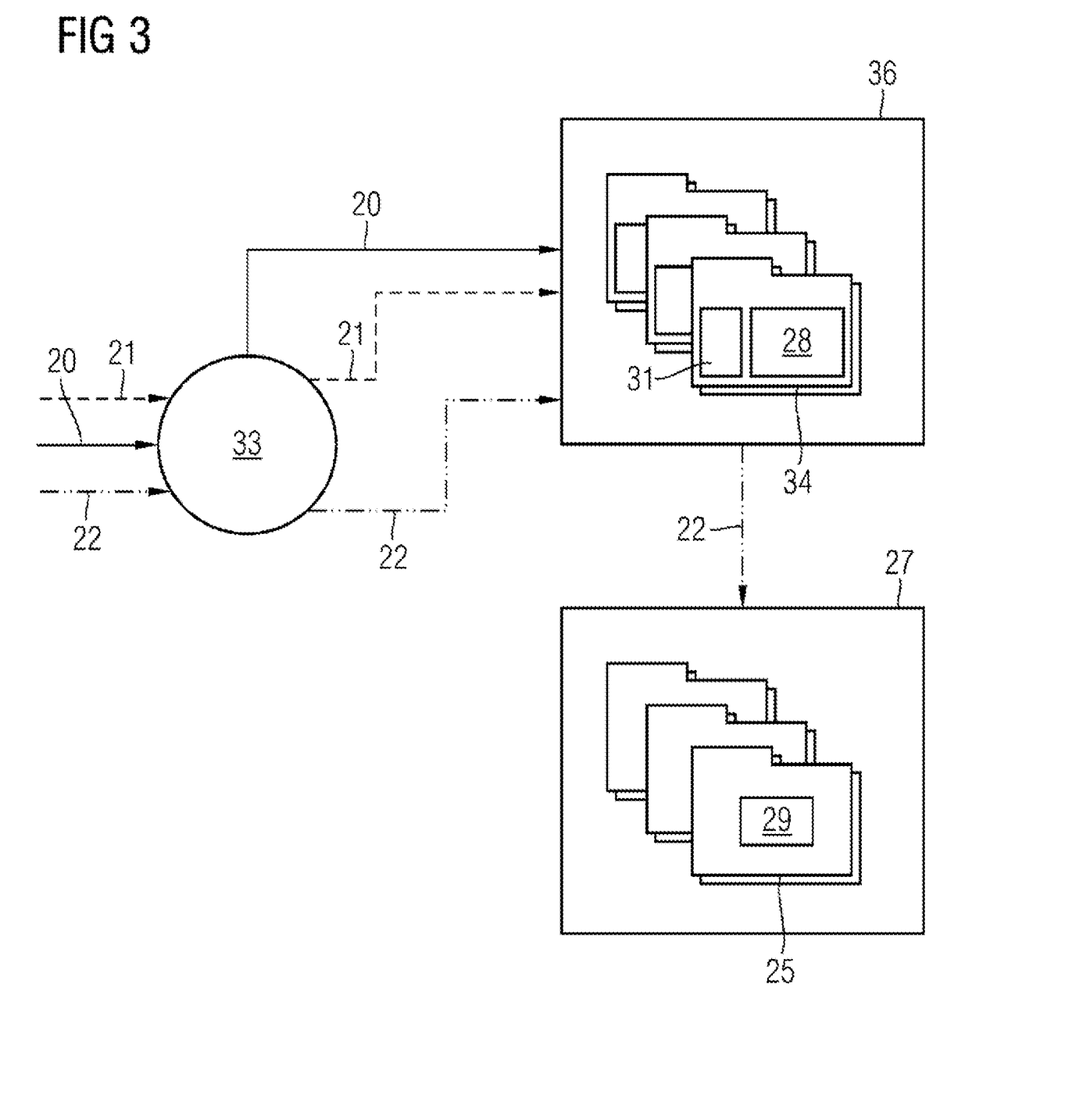
FIG. 3 shows a third embodiment of the method with checking in a work container in a schematic illustration.

FIG. 3 shows an embodiment of the method in which the checking and forwarding of request messages 20, 21, 22 are not carried out in a load balancing device 33, but rather in each of the load defense containers 34 of the load defense container pool 36. For this purpose, for example, a representative unit 31 is provided in each work container 34.

Instead of central recognition of the overload situation by the orchestration software in the mode balancing device 33, the representative unit 31 disposed upstream of an unmodified processing form 28 can initiate the forwarding locally on the work container 34 by checking the local capacity utilization of the corresponding work container 34. Alternatively, the currently existing capacity utilization L can be made available to the representative unit 31 by the orchestration software, i.e., in particular by the mode balancing device 33. This existing capacity utilization made available is used for checking the request message 20, 21, 22.

In order to be able to carry out the forwarding of the request messages 20, 21, 22 to a load defense container, the forwarding has to be carried out by a state-oriented packet inspection. A packet is a data packet, as defined for example in the Internet protocol. FIG. 2 illustrates request messages 20, 21 and subsequent connection for implementing the application. These request messages 20, 21 are forwarded to an arbitrary work container 24 in a stateless manner by the load balancing device 23. The state-oriented packet inspection is implemented such that a distinction is drawn only between request messages 20, 21 that are forwarded to a work container 24 and request messages 22 and their subsequent messages that are directed to a load defense container 25, 25.1, 25.2. A state-oriented packet inspection with respect to the individual work or load defense containers 24, 25 within a work container pool 26 or a load defense container pool 27 is not necessary. It is thus possible to switch back and forth arbitrarily between the individual containers in a pool.

In FIG. 3, the load balancing device 33 balances the request messages 20, 21, 22 in a stateless manner and thus arbitrarily among the work containers 34 in the work container pool 36. In the work container pool 36, a representative unit 31 is installed in each container 34 and decides whether the request message 20, 21, 22 is forwarded to the unmodified processing form 28 of the application or to a load defense container 25. Each representative unit 31 has to be notified of the respective forwarding destination, that is say either the unmodified processing form 28 in the work container 34 or the modified processing form 29 in the load defense container 25 to which the request message is intended to be forwarded. The forwarding of the request message 22 to a load defense container 25 is carried out by state-oriented packet inspection in the representative unit 31.

It is necessary to ensure that the load defense containers 25 can either be kept available permanently or be activated by the representative unit 31 or the orchestration software in the mode balancing device 23.

Figure 4:
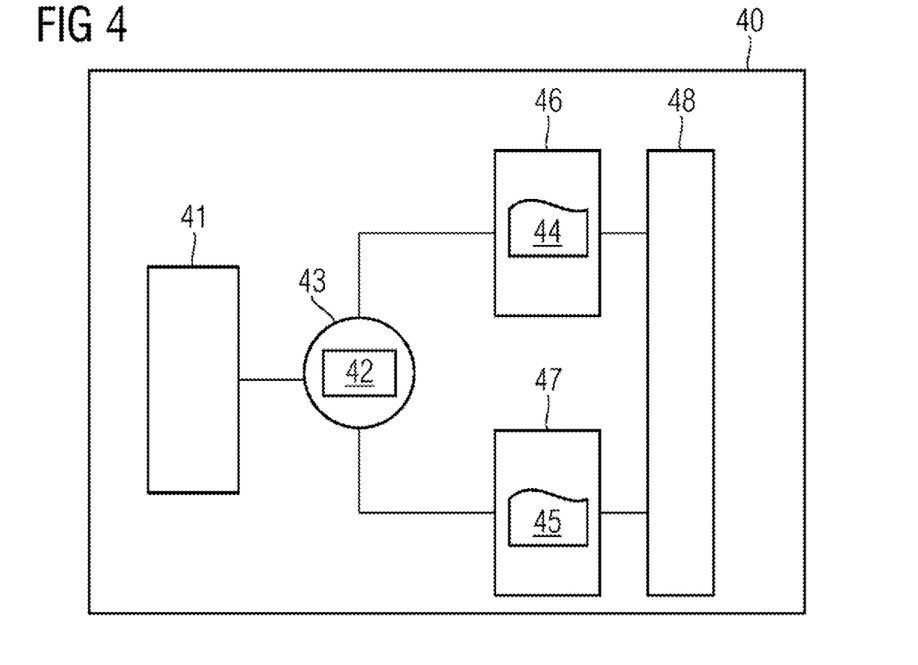
FIG. 4 shows a first exemplary embodiment of the computing apparatus in a block illustration.

FIG. 4 then shows a computing apparatus 40 that provides an application by container virtualization. In this case, one or a plurality of work containers 44 from a work container pool 46 and one or a plurality of load defense containers 45 from a load defense container pool 47 access a common operating system 48 provided by the computing apparatus. The computing apparatus 40 furthermore comprises a receiving unit 41 and a load balancing device 43. The load balancing device 43 comprises a control unit 42 configured to carry out the checking and forwarding of the method according to embodiments of the invention. The load balancing device 43 is realized in particular by orchestration software. The control device 42 comprises a checking unit and a forwarding unit, which are embodied in an integrated manner, as illustrated, or in a manner separated into two parts. The control device 42 can be embodied in terms of software technology, for example as part of the orchestration software, or else in terms of hardware technology, for example on one or a plurality of processors.

Figure 5:
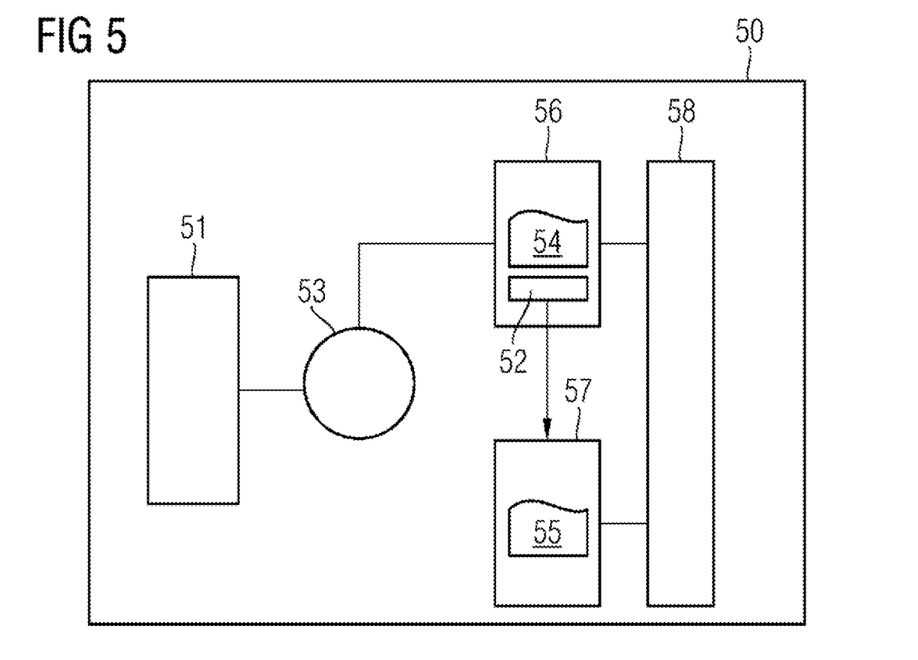
FIG. 5 shows a second exemplary embodiment of the computing apparatus in a block illustration.

FIG. 5 shows a further exemplary embodiment of a computing apparatus 50, which, in a manner corresponding to the computing apparatus 40, implements a computer-implemented application in a container-virtualized manner by work containers 54 and load containers 55 from a work container pool 56 and a load defense container pool 57, respectively. The work container pool 56 and the load defense container pool 57 access a common operating system 58. The computing apparatus 50 furthermore comprises a receiving unit 51 and a mode balancing device 53. In this case, the mode balancing device 53 forwards all received request messages from the receiving unit 51 to the work container pool 56. In this case, each request message is forwarded to a representative unit 52 disposed upstream of the work container 54. The representative unit 52 forwards the request message to a load defense container 55 in the load container pool 57 in the case of overload.

Consequently, load defense by load defense containers being supplementarily switched in commences at an early stage as load increases, and can thus already protect against load before the computing apparatus or the work containers reach overload.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for overload control in a container-virtualized computing apparatus that provides a computer-implemented application by at least one work container, the method comprising:

receiving a plurality of request messages for calling the computer-implemented application;

checking a currently existing capacity utilization of the container-virtualized computing apparatus in relation to a predefined load limit value, wherein the predefined load limit value has different load type-specific limit values that are dependent on a type of capacity utilization currently existing at the container-virtualized computing apparatus; and in response to the current capacity utilization being higher than the predefined load limit value, forwarding the request messages to a load defense container, which provides the computer-implemented application in modified form such that a number the plurality of request messages or resources for providing the computer-implemented application is reduced in relation to the at least one work container, wherein the checking is carried out in a load balancing device by orchestration software or the checking is carried out in the least one work container;

wherein the request messages are forwarded to different load defense containers, which provide the computer-implemented application in different modified forms, depending on the type of the currently existing capacity utilization;

wherein each request message is forwarded to a representative unit in a work container pool that disposed upstream of the at least one work container, and the representative unit forwards the request message to load defense containers in a load container pool in response to the current capacity utilization being higher than the predefined load limit value, and as a consequence, a load defense by the load defense containers are supplementarily switched as load increases to protect against load before the container-virtualized computing apparatus or work containers in the work container pool reach overload.

2. The method as claimed in claim 1, wherein the forwarding is carried out in a work container.

3. The method as claimed in claim 2, wherein the checking and forwarding are carried out in a representative unit arranged-in the work container.

4. The method as claimed in claim 1, wherein forwarding the request message to the load defense container is carried out by a state-oriented packet inspection.

5. The method as claimed in claim 1, wherein the forwarding is additionally carried out depending on at least one of the following criteria:
a type of the computer-implemented application;
an identifier of a sender of the request message; and
a role of a user of the request message.

6. The method as claimed in claim 1, wherein, in the load defense container, the request message is analyzed in relation to behavior patterns in a case of requests determined in advance.

7. The method as claimed in claim 1, wherein in the load defense container the request message is analyzed in relation to an attack pattern interrogated at an attack database.

8. The method as claimed in claim 1, wherein one or more load defense containers are provided depending on the currently existing capacity utilization of the computing apparatus in addition to existing work containers or as a replacement for an existing work container.

9. The method as claimed in claim 1, wherein the request message is forwarded to an existing load defense container or to a pool of load defense containers containing a plurality of load defense containers.

10. A computing apparatus for container-virtualized provision of a computer-implemented application by at least one work container, comprising:

one or more processor configured to:

receive a plurality of request messages for calling the computer-implemented application;

to check a currently existing capacity utilization of the computing apparatus in relation to a predefined load limit value, wherein the predefined load limit value has different load type-specific limit values that are dependent on a type of capacity utilization currently existing at the container-virtualized computing apparatus and, in response to the currently existing capacity utilization being higher than the predefined load limit value, to forward the request messages to a load defense container, which provides the computer-implemented application in modified form such that the plurality of a number of request messages or resources for providing the computer-implemented application is reduced in relation to the work container, wherein checking of the currently existing capacity utilization is carried out in a load balancing device by orchestration software; or the checking is carried out in the work container;

wherein the request messages are forwarded to different load defense containers, which provide the computer-implemented application in different modified forms, depending on the type of the currently existing capacity utilization;

wherein each request message is forwarded to a representative unit in a work container pool that disposed upstream of the at least one work container, and the representative unit forwards the request message to load defense containers in a load container pool in response to the current capacity utilization being higher than the predefined load limit value, and as a consequence, a load defense by the load defense containers are supplementarily switched as load increases to protect against load before the container-virtualized computing apparatus or work containers in the work container pool reach overload.

11. The computing apparatus as claimed in claim 10, wherein the load balancing device forwards the request message to the work container or to the load defense container depending on the checking.

12. The computing apparatus as claimed in claim 10, wherein the request message is forwarded locally on the work container.

13. A computer program product, comprising a computer readable hardware storage device having computer readable program code stored therein, said program code executable by a processor of a computer system to implement a method as claimed in claim 1.

* * * * *